United States Patent [19]

Karppanen et al.

[11] Patent Number: 5,619,552
[45] Date of Patent: Apr. 8, 1997

[54] ARRANGEMENT AND METHOD FOR LOCATION REGISTRATION

[75] Inventors: Arto Karppanen, Helsinki; Reino Talarmo, Riihimäki; Markku Tuohino, Espoo, all of Finland

[73] Assignee: Nokia Telecommunications OY, Espoo, Finland

[21] Appl. No.: 416,867

[22] PCT Filed: Aug. 19, 1994

[86] PCT No.: PCT/FI94/00363

§ 371 Date: Apr. 19, 1995

§ 102(e) Date: Apr. 19, 1995

[87] PCT Pub. No.: WO95/06396

PCT Pub. Date: Mar. 2, 1995

[30] Foreign Application Priority Data

Aug. 20, 1993 [FI] Finland ..................................... 933693

[51] Int. Cl.[6] .................................................. H04Q 7/22
[52] U.S. Cl. .................................. 379/60; 455/33.2
[58] Field of Search ................................ 379/58, 59, 60, 379/63; 455/33.1, 33.2, 33.4, 54.1, 56.1

[56] References Cited

U.S. PATENT DOCUMENTS 4,833,701 5/1989 Comroe et al. ........................ 379/60
5,090,050 2/1992 Heffernan ............................. 379/60

FOREIGN PATENT DOCUMENTS 2245455 1/1992 United Kingdom .
9405129 3/1994 WIPO .

*Primary Examiner*—Dwayne D. Bost
*Assistant Examiner*—Michael B. Chernoff
*Attorney, Agent, or Firm*—Cushman Darby & Cushman IP Group of Pillsbury Madison & Sutro LLP

[57] ABSTRACT

A method and an arrangement for subscriber location management among a group of radio networks comprising at least two radio networks (101, PMR1, PMR2) in which at least some of the subscribers (SBR1, SBR2, SBR3) may roam away from the home network and register in another radio network over the radio path. To enable centralized subscriber location management, the subscriber database (HLR) of one radio network (101) is arranged to maintain in a centralized manner the location data of all subscribers (SBR1) that have roamed outside their home networks and registered in another radio network (PMR2) at least with an accuracy of a radio network.

17 Claims, 1 Drawing Sheet

ARRANGEMENT AND METHOD FOR LOCATION REGISTRATION

FIELD OF THE INVENTION

The invention relates to an arrangement and a method for subscriber location management among a group of radio networks comprising at least a first and a second radio network in which at least some of the subscribers may roam away from the first radio network, which is the subscribers' home network, and register in the second radio network over the radio path.

BACKGROUND OF THE INVENTION

The mobile telephone networks of the prior art have typically had their own independent location management systems, which have not communicated with other radio networks in respect of location management. This has been the case even if several radio systems have been combined to form a single radio network. In GSM systems, location management is standardized so that all GSM systems of different operators can communicate with each other as regards location management. In GSM systems, the location management of a mobile phone is performed by the home network of this mobile phone. The situation is more complicated when several mobile telephone networks of different kinds are combined, e.g. a GSM-type radio network and private radio networks such as PMR-type (Private Mobile Radio) networks. Networks of different types have usually not been able to communicate with each other regarding location management.

A disadvantage of these prior art solutions is that each network requires its own location management system. This is naturally very expensive, as each radio system must have its own location management registers, which are continuously aware of the location of each subscriber.

BRIEF DESCRIPTION OF THE INVENTION

The object of the invention is to provide such an advantageous location management method and system for subscribers of interconnected radio systems by which the problems with the solutions of the prior art are avoided.

This new type of arrangement for location management among radio networks is achieved with the arrangement according to the invention, which is characterized in that the subscriber database of a third radio network, which does not belong to the same group of radio networks as said first and second radio network, and in which the subscribers of said first and second radio network cannot register, is arranged to maintain in a centralized manner the location data of all the subscribers that have roamed away from their home network and registered in the second radio network at least with an accuracy of a radio network.

The new type of method for performing location management among radio networks is achieved with the method according to the invention, which is characterized in that the subscriber database of a third radio network, which does not belong to the same group of radio networks as said first and second radio network, and in which the subscribers of said first and second radio network cannot register, maintains in a centralized manner the location data of all the subscribers that have roamed away from their home network and registered in the second radio network at least with an accuracy of a radio network.

The invention is based on the idea that the location and subscriber data management in interconnected radio systems can be performed, if necessary, by a centralized network element. The system may comprise local registers for location and subscriber data management; these registers maintain location and subscriber data locally within the area of the subscriber's home network. When the subscriber roams outside the service area of his home network, the subscriber location management is performed by a location management register which is located outside the home network, possibly in another radio network.

An advantage of the system and method according to the invention for subscriber location management among radio networks is that it allows construction of mobile telephone networks which do not comprise location and/or subscriber data management of their own, nor registers for this purpose. It is thus possible to utilize the properties and registers of the location and subscriber data management of another mobile telephone network, and it is therefore not necessary to implement these properties in the network to be constructed. This naturally reduces the costs.

A further advantage of the invention is that if there already exists a radio network in the area to be constructed, it is possible to utilize the existing location and subscriber data management registers and functions. Since existing systems can be used, fewer design efforts are needed.

Yet another advantage of the invention is that it allows the location data of subscribers locating outside their home network to be stored in a centralized subscriber database. The exchange of the subscriber's home network can then request the location data from the centralized database. In this way the home exchange of the subscriber obtains the routing data for routing a call.

BRIEF DESCRIPTION OF THE DRAWINGS

In the following, the invention will be described in greater detail with reference to the accompanying drawings, in which.

DETAILED DESCRIPTION OF THE INVENTION

Figure 1:
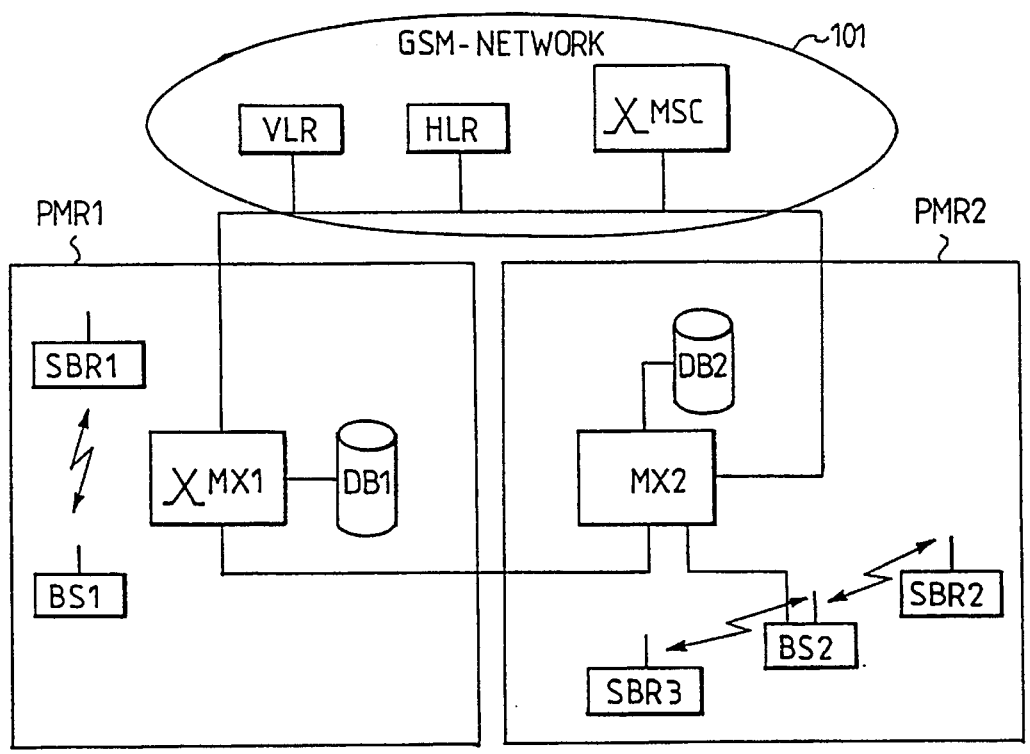
FIG. 1 illustrates the arrangement of the invention.

FIG. 1 illustrates a system according to the invention. PMR2 represents a PMR system with no location management; the network elements, i.e. the exchange MX2, use the location management services provided by the home location register HLR of the GSM network. This PMR2 network may be, for example, a TETRA-type network (TETRA= Trans European Trunked Radio). When a subscriber SBR2 of the PMR2 network registers through the base station BS2 and by means of the exchange MX2 in the PMR2 network, the exchange MX2 of the radio network updates—or in fact, requests the home location register HLR of the GSM network to update—the location of the mobile station, or the subscriber SBR2. The following is a description of establishment of a call when a subscriber SBR2 residing in the service area of the MX2 wishes to set up a connection to a subscriber SBR3 located within the service area of the same radio network, or to a subscriber SBR1 located within the service area of another radio network, e.g. another TETRA system. The establishment of the call begins in such a way that the subscriber SBR2 sends a call set-up message to the exchange MX2 of its own location area. The MX2 requests the location data of the called subscriber SBR3 or SBR1, i.e. information of the location of the SBR3 or SBR1, from the subscriber database, or the HLR, of another radio network, in this case the GSM network. The home location register HLR of the GSM system responds by sending the location data of the called subscriber, or the B-subscriber, to the exchange MX2. Having received the response, the MX2 sets up a connection to the exchange MX1 in whose service area the called subscriber SBR1 is located, or if the called subscriber is located in the area of the PMR2 network, the exchange MX2 sets up a telecommunication connection between the calling SBR2 and the called SBR3. This call establishment may take place over a suitable signalling path.

In the case described above, when the called subscriber SBR3 was located within the service area of the same exchange MX2 as the calling subscriber SBR2, the exchange MX2 requested the location data of the called subscriber, or B-subscriber, from the home location register HLR of the GSM network. An alternative solution is illustrated by means of the PMR1 network. The PMR1 network maintains a local database DB1 which is a common local database of both the subscribers whose home network the PMR1 network is and the subscribers visiting the service area of that PMR1 network. If a telecommunication connection is to be established to a subscriber located within the service area of the PMR1 network, the data of the called subscriber are requested from the home location register HLR of the GSM network 101 only if they are not obtained from the local database DB1. The home location register HLR of the GSM network functions thus as a database for all the different systems, and the local database of the PMR1 network speeds up the call establishment when the subscriber SBR1 is located within the service area of the same network PMR1 or exchange MX1.

In the arrangement of the invention, the subscribers of the PMR1 and PMR2 networks may utilize the location management mechanism of the GSM network so that at least some of the subscriber numbers of the PMR network are GSM numbers and some of them are numbers of the PMR network, e.g. a TETRA network. Even if a GSM number is allocated to a subscriber, it is possible that the subscriber is entitled to use the services of only one or more PMR networks. According to the invention, a PMR network is allowed to utilize part of the functions of the home location register HLR of another radio network, e.g. a GSM network. This means that part of the resources, i.e. the computer time and storage locations, of the home location register of the GSM network is dedicated solely to the subscribers of the PMR network such as a TETRA network; the location data stored in the part of the register dedicated to the PMR network cover only the subscribers of the PMR network, i.e. the TETRA subscribers, for example.

If the subscriber database DB1 of the PMR1 network, shown in FIG. 1, is in use, the home location register HLR of the GSM network should update this database when the subscriber roams from one exchange to another. On the other hand, the HLR of the GSM network does not have to know with an accuracy of a base station where a subscriber is located within the area of a PMR network or its exchange, but this data may be stored in the local database DB1 of the PMR network. These database functions may be called virtual database functions of the GSM network.

At least if the exchange of a PMR network, a TETRA network, does not comprise a local location database DB1, even the visitor location register VLR of the GSM network is used in respect of visiting subscribers. In this case, a visiting subscriber is a subscriber not known by the home location register HLR of the GSM network. It is thus assumed that all the PMR networks that are connected to the GSM network form separate addressing domains, i.e. subdomains, in the HLR of the GSM network, but are equal in other respects; if a subscriber roams from one connected PMR1 network to another connected PMR2 network, the subscriber data do not therefore have to be stored in the visitor location register VLR of the GSM network.

According to the invention, the home network of the subscriber is considered to be the network which recognizes the subscriber as one of its own subscribers. This may be implemented in such a manner that the subscribers whose home network a certain radio network is are indicated in the subscriber database of that radio network.

Figure 2:
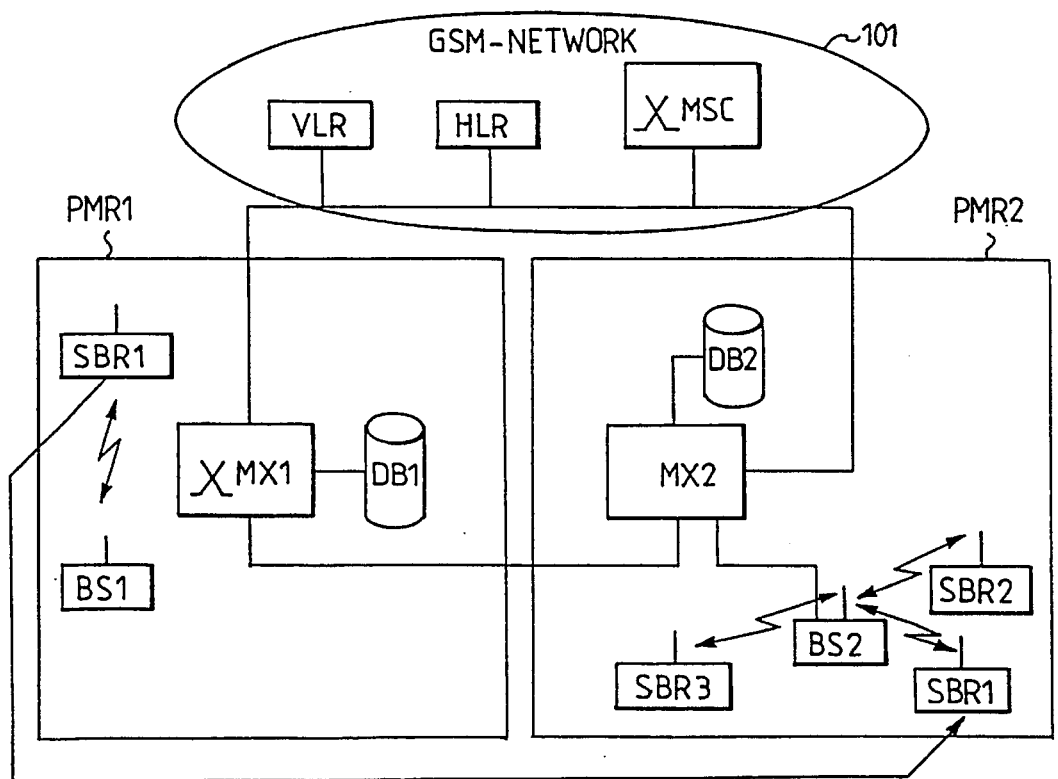
FIG. 2 illustrates the operation of the system of the invention when a subscriber roams from a first private radio network to a second private radio network.

FIG. 2 illustrates the operation of the system according to the invention in a situation where a subscriber SBR1 moves from a first network PMR1 to a second network PMR2. The subscriber is at first registered in the service area of his own PMR1, or TETRA, network. The home location register HLR of the GSM network 101 contains the subscriber data of this subscriber and information about the fact that the subscriber is located within the service area of the exchange MX1 of his own PMR network PMR1. In addition, the local location database DB1 of the TETRA network contains data on the actual, accurate location area of the subscriber (LAI=Location Area Identification) or on the base station BS1 in the coverage area of which the subscriber is located. The subscriber SBR1 roams 110 to the area of the second PMR network PMR2, and transmits a registration message to a base station of this network, e.g. to base station BS2. The base station BS2 transmits the data on the registration of the new subscriber to its exchange MX2. The exchange MX2 detects that the PMR2 network is not the home network of the subscriber SBR1. Thereafter the exchange MX2 requests the subscriber data of the subscriber from the home location register HLR of the GSM network. If, on the basis of the subscriber data, the subscriber SBR1 is entitled to use the services of the PMR2 network, the exchange MX2 sends the subscriber SBR2 an acknowledgement of the registration, stores the data on the base station or location area LAI used by the subscriber in a local register, i.e. in database DB2, or this data is sent to the home location register HLR of the GSM network. The HLR of the GSM network informs the PMR network PMR1 from which the subscriber has come that the subscriber has left the service area of that network, and that the subscriber can now be reached on the basis of the data stored in the HLR of the GSM network. Thereafter the PMR1 removes the location data of the subscriber SBR1 from its own local database DB1 and possibly acknowledges this to the HLR of the GSM network.

A feature of the present invention is that, in addition to the location data of a subscriber, the centralized database also maintains other subscriber data, for example data on the services which the subscriber is entitled to use. Such data may include, for instance, information on which networks the subscriber is allowed to register in, and which networks the subscriber is allowed to call to. They may also include information on which additional services or service restrictions apply to the subscriber.

Another feature of the invention is that the centralized database which maintains the location data of a subscriber and possibly the subscriber data of the subscriber is a database of a radio network which is not one of the above-mentioned group of radio networks and in which the subscribers of the above-mentioned radio networks cannot register over the radio path.

The drawings and the description relating thereto are intended merely to illustrate the inventive concept. In its details, the arrangement and method of the invention for subscriber location management among radio networks may vary within the scope of the appended claims. Even though the invention has been described above mainly with reference to GSM and TETRA networks, the invention may also be applied to other kinds of mobile telephone and radio networks.

What is claimed is:

1. An arrangement for subscriber location management among a group of radio networks comprising at least a first and a second radio network in which at least some of the subscribers may roam away from the first radio network, which is the subscribers' home network, and register in the second radio network over the radio path, wherein the subscriber database of a third radio network, which does not belong to the same group of radio networks as said first and second radio network, and in which the subscribers of said first and second radio network cannot register, is arranged to maintain in a centralized manner the location data of all the subscribers that have roamed away from their home network and registered in the second radio network at least with an accuracy of a radio network.

2. An arrangement according to claim 1, wherein said centralized subscriber database of the third radio network is arranged to maintain information on which one of said first and second networks a subscriber is located in, and more accurate information on the location of the subscriber within that network.

3. An arrangement according to claim 1, wherein each first and second radio network comprises at least one subscriber database arranged to maintain the location data of one or more subscribers located within the service area of that radio network, and that the centralized database of said third radio network is arranged to maintain information on which one of said first and second radio networks the subscriber is located in.

4. An arrangement according to claim 1, wherein in addition to the location data of a subscriber, said centralized database also maintains other subscriber data.

5. An arrangement according to claim 3, wherein in addition to the location data of a subscriber, said centralized database also maintains other subscriber data.

6. An arrangement according to claim 1, wherein said subscriber data define the services which said subscriber is entitled to use.

7. An arrangement according to claim 3, wherein said subscriber data define the services which said subscriber is entitled to use.

8. An arrangement according to claim 4, wherein said subscriber data define the services which said subscriber is entitled to use.

9. An arrangement according to claim 5, wherein said subscriber data define the services which said subscriber is entitled to use.

10. A method for subscriber location management among a group of radio networks comprising at least a first and a second radio network in which at least some of the subscribers may roam away from the first radio network, which is the subscribers' home network, and register in the second PMR radio network over the radio path, wherein the subscriber database of a third radio network, which does not belong to the same group of radio networks as said first and second radio network, and in which the subscribers of said first and second radio network cannot register, maintains in a centralized manner the location data of all the subscribers that have roamed away from their home network and registered in the second radio network at least with an accuracy of a radio network.

11. A method according to claim 10, wherein the establishment of a call from the home network to a subscriber located outside the home network comprises receiving a call in the home network, requesting routing data from the centralized subscriber database, since the called subscriber is not located within the service area of the home network, receiving routing data from the centralized subscriber database, routing the call from the home network to the radio network indicated by the routing data.

12. A method according to claim 10, wherein one or more databases of at least one of said first and second radio network maintains the location data and/or the subscriber data of one or more subscribers located within the service area of said network.

13. A method according to claim 12, wherein when a telecommunication connection is established to a subscriber located within the service area of said radio network, the telecommunication connection to the subscriber is set up to the exchange of the subscriber's home network, the exchange of the radio network in the location area of the subscriber requests the location data and/or the subscriber data of said subscriber from the subscriber database of the radio network, the exchange of the radio network in the location area of the subscriber receives the location data and/or the subscriber data of said subscriber and establishes the telecommunication connection to said subscriber.

14. A method according to claim 10, wherein said subscriber data define the services which said subscriber is entitled to use.

15. A method according to claim 11, wherein said subscriber data define the services which said subscriber is entitled to use.

16. A method according to claim 12, wherein said subscriber data define the services which said subscriber is entitled to use.

17. A method according to claim 13, wherein said subscriber data define the services which said subscriber is entitled to use.

\* \* \* \* \*